Patented Apr. 29, 1941

2,239,752

UNITED STATES PATENT OFFICE 2,239,752

METHOD OF LUBRICATION

Arthur Walther Lewis, Elizabeth, N. J., assignor to Tide Water Associated Oil Company, Bayonne, N. J., a corporation of Delaware No Drawing. Application April 2, 1937, Serial No. 134,516

3 Claims. (Cl. 252—50)

This invention relates to lubricants intended for service in the lubrication of internal combustion engines. The invention more particularly is concerned with lubricating or motor oils of mineral hydrocarbon origin which are normally corrosive toward bearing metal alloys of the character of cadmium-silver, cadmium-nickel or copper-lead, as well as those bearing metals of exceptionally high lead content (of the order of 75% to 99%) wherein minor proportions of alloying metals impart unusual hardness to the alloy; and has, for an improtant objective, the inhibition or prevention of deterioration of such bearing metal in service by the corrosive action of the lubricant thereon.

Engine bearings comprising or surfaced with cadmium-silver, "high-lead" or like alloys now are frequently employed in lieu of the more usual Babbitt metal bearings, in order to cope with extreme service conditions of friction and temperature. These conditions are the consequences of modern developments in internal combustion engines making available high sustained speeds and requiring bearings formed of metals or alloys having greater resistance to wear, and further characterized by higher melting points necessary to prolonged life under the extreme thermal conditions existing during operation of the engine. Temperatures at the bearing surfaces during operation are, or may be, much higher in the case of engines requiring these new bearings than formerly was the circumstance with engines in which Babbitt metal bearings gave satisfactory service.

Experience with bearings of the character or type exemplified by cadmium-silver, cadmium-nickel, copper-lead and "high-lead" alloys has demonstrated, however, that their utility is greatly impaired by an extreme susceptibility to rapid deterioration by the corrosive action or effect of many available lubricating oils. Particularly has this effect been noted when the oils are of the character generally regarded as superior lubricants by conventional criteria.

Little is known concerning the nature of the corrosive action or its causes; but in general it has been observed that motor oils derived from selected crudes predominantly paraffinic in origin, as well as those oils from these or other crudes which have been improved by treatment with selective solvents, exhibit a marked tendency toward corrosion of the bearings in question, although by other tokens the lubricant is of superior quality. Oxidation stability, as indicated by sludge or acid formation in conventional tests indicative of the tendency toward deterioration of the oil itself in service, does not appear to have reliable correlation with the tendency of the oil to corrode bearing surfaces. It is possible that the high bearing surface temperatures existing under service conditions with the new bearings may be a factor in occasioning the observed deleterious effect of motor oils thereupon. It would appear, also, that the problem of bearing corrosion, with which the present invention is particularly concerned, contrasts with problems of lubricant deterioration per se, since oils characterized by long life and good stability in conventional tests may, and frequently do, prove to be the most corrosive in bearing corrosion tests. No theory in explanation of the observed corrosive action or the prevention thereof, as herein proposed according to the invention, is intended to be relied upon.

According to the present invention, it has now been found that the corrosive effect of lubricating oils upon bearing surfaces of the character referred to above may be avoided in novel and effective manner by incorporating with such oils particular compounds having a retarding or inhibiting effect in respect of such corrosion. More specifically, the invention arises from the discovery that a compound comprising benzo nitrile effects a very beneficial retardation of the corrosive action of internal combustion engine lubricating oils upon cadmium-silver, cadmium-nickel, copper-lead, "high-lead" and like bearing metal alloys.

It is, therefore, an important object of the present invention to inhibit or retard the corrosive deterioration of these and like bearing metal alloys in automotive service by providing a lubricant therefor comprising a refined mineral hydrocarbon oil having incorporated therewith benzo nitrile in small but effective proportion. Likewise, it is an object of the invention to improve, and to prepare improved, motor oils of petroleum origin by incorporating therein benzo nitrile in corrosion inhibiting proportions. The provision of an inhibitor effective for such purpose and comprising a compound as aforementioned naturally is a major objective.

Viewed in another aspect, the invention may be regarded as encompassing a novel method of lubricating bearing metal surfaces, of the character of cadmium-silver, cadmium-nickel, copper-lead, "high-lead" or like alloys, by applying thereto a film of lubricant comprising mineral hydrocarbon oil having incorporated therewith a small but effective proportion of benzo nitrile.

With this method of lubrication it has been found that prolonged life and consequent improved service may be attained in the use of these alloys as bearing metals of internal combustion engines, particularly when operating conditions such as high sustained speeds under load occasion unusually high bearing surface temperatures. Ordinarily, the oil selected for use, in applying the lubricating method of the invention to its intended service, will be of a character generally regarded as of superior grade and refining. Thus, the invention finds particular utility in making possible the beneficial use of such oils by avoiding deleterious consequences otherwise encountered when no preventive measures are taken against the corrosive deterioration of bearing metal alloys as hereinbefore referred to. It will be understood, however, that the invention contemplates no limitation in this respect, and that the method of lubrication herein described may be practiced in conjunction with mineral hydrocarbon lubricating oils taken as a broad class and regardless of origin.

Benzo nitrile is a compound which is believed to conform to the structural formula

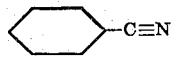

Solubility in mineral hydrocarbon oil of motor lubricating oil character is limited, but the proportion necessary to accomplish the objects of the present invention is well within the limits of solubility. It suffices, therefore, simply to dissolve benzo nitrile (if desired with moderate application of heat to facilitate solution) in motor oil intended for service in internal combustion engines in order to prepare for the lubrication thereof according to the invention. Proportions as low as 0.2% by weight of the compound dissolved in motor oil are shown by the illustrative data hereinafter presented to be markedly inhibitive of the corrosion normally attending the use of many lubricating oils with bearing metals of the type comprising alloys as hereinbefore mentioned. The stated percentage is not intended as a limitation upon the contemplated scope and practice of the invention, as obviously the inhibitor may be, and is intended to be, employed in any corrosion inhibiting proportion.

The tendency of motor oils to corrode bearings of the character in question may be determined by a convenient test which affords a ready method of obtaining a comparative evaluation of motor oils in the laboratory. In this test method a group of bearings, ordinarily including at least one each of several of the newer bearing metal alloys (viz: cadmium-silver, cadmium-nickel and copper-lead) is supported in a chamber in which air may circulate and the bearing surfaces are exposed for a period of 22 hours to a stream of oil sprayed under pressure continuously upon the corrodible area. The oil is maintained at a temperature of approximately 335° F. and the spray is so directed as to disperse the oil over the surfaces of the bearings. Means are provided for re-circulating the sprayed oil so that a given quantity is used for a given test, thus simulating service conditions in an engine. The measure of corrosion is taken as the loss in weight of the bearing per unit of exposed corrodible surface.

The test method described above is carried out in the familiar Underwood corrosion apparatus supplied by the Scientific Instrument Company of Detroit, Michigan, in accordance with General Motors specifications.

Results obtained utilizing the foregoing test for comparative evaluation of motor oils with and without an inhibitor according to the invention provide specific illustration of the value and inhibiting effectiveness of benzo nitrile. The oil used for the test was an S. A. E. 20 motor oil comprising a blend of well refined paraffinic base stocks and having an A. P. I. gravity of 30.1, Saybolt viscosity @ 100° F. of about 300 seconds, Saybolt viscosity @ 210° F. of 54 seconds and flash point of 425° F. Inhibitor, when added, was used in an amount of 0.2% by weight based on the oil. During each run cadmium-silver, cadmium-nickel and copper-lead bearings all were present; and comparative losses in weight per square decimeter due to corrosion were observed as follows for the respective bearings:

| Bearing | Oil blank | Oil plus benzo nitrile |
| --- | --- | --- |
| | Grams | Grams |
| Cadmium-silver | 6.6 | 1.7 |
| Cadmium-nickel | 5.2 | 1.4 |
| Copper-lead | 0.9 | 0.2 |

Used oil from the blank run, upon test, showed an increase in carbon residue from less than 0.4 to 3.60 and a neutralization number of 5.65 milligrams KOH per gram of oil. By contrast, the used oil from the run in which benzo nitrile was present as an inhibitor showed a carbon residue increase from less than 0.4 to but 1.53; while the neutralization number of the used oil from the inhibitor run was 2.29.

While the utility of the invention has been illustrated specifically with reference to a particular motor oil, no limitation is to be inferred therefrom, and other oils, whether or not comparable in specification or origin, may be used in the lubrication of bearings of the type described in accordance with the invention.

I claim:

1. The method of lubricating bearings having substantially the corrosion susceptibility characterizing cadmium-silver, cadmium-nickel and copper-lead alloys, which consists in applying to the bearing surfaces lubricant comprising mineral hydrocarbon oil of a character normally tending to corrode said bearings and having incorporated therein corrosion inhibiting proportions of benzo nitrile.

2. The method of lubricating bearing surfaces in internal combustion engines, which bearing surfaces comprise an alloy having substantially the corrosion susceptibility characterizing cadmium-silver, cadmium-nickel and copper-lead alloys, which consists in applying to said bearing surfaces lubricant comprising mineral hydrocarbon oil normally tending to corrode the same and having incorporated therein corrosion inhibiting proportions of benzo nitrile.

3. In the lubrication of bearing surfaces, at least one of which is formed of an alloy having the corrosion susceptibility characterizing cadmium-silver, cadmium-nickel and copper-lead alloys, with mineral hydrocarbon oil normally tending to cause substantial and rapid corrosion thereof, the method of inhibiting such corrosion, which comprises incorporating with said oil corrosion inhibiting proportions of benzo nitrile.

ARTHUR WALTHER LEWIS.